Figure 1:
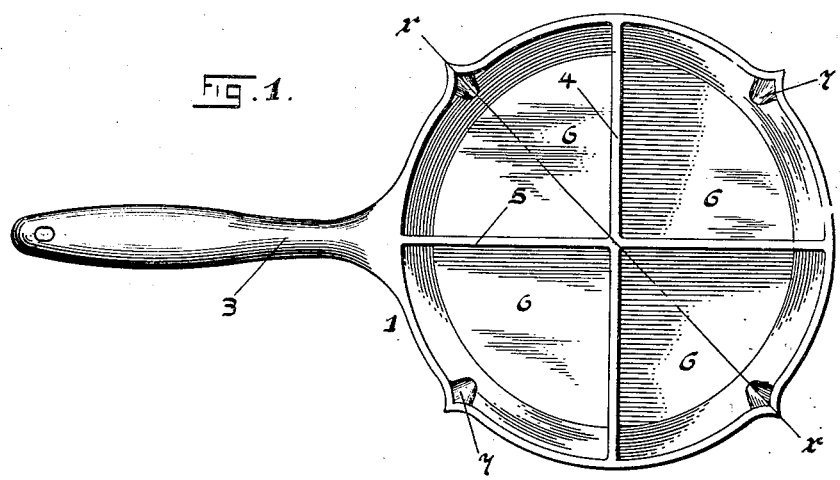

No. 894,118. PATENTED JULY 21, 1908.
B. COMPSTON.
COOKING PAN.
APPLICATION FILED NOV. 26, 1906.

WITNESSES:
Jesse C. Miller.

INVENTOR
Belle Compston.
By H. C. Evert & Co,
Attorneys

UNITED STATES PATENT OFFICE.

BELLE COMPSTON, OF HOMESTEAD, PENNSYLVANIA.

COOKING-PAN.

No. 894,118.  Specification of Letters Patent.  Patented July 21, 1908.

Application filed November 26, 1906. Serial No. 345,088.

*To all whom it may concern:*

Be it known that I, BELLE COMPSTON, a citizen of the United States of America, residing at Homestead, in the county of Allegheny and State of Pennsylvania, have invented certain new and useful Improvements in Cooking-Pans, of which the following is a specification, reference being had therein to the accompanying drawing.

This invention relates to certain new and useful improvements in cooking utensils, the invention having for its primary object to provide a frying pan or similar utensil having a plurality of compartments formed therein, whereby various vegetables, meats or eatables can be fried or cooked independently of one another.

Another object of this invention is to provide a simple and inexpensive cooking utensil having compartments formed therein, from each of which a liquid can be poured.

With these and other objects in view, which will more readily appear as the invention is better understood, the same consists in the novel construction to be hereinafter more fully described and then specifically pointed out in the appended claims.

Referring to the drawing forming part of this specification, like numerals of reference designate corresponding parts throughout the several views, in which:—

Figure 2:
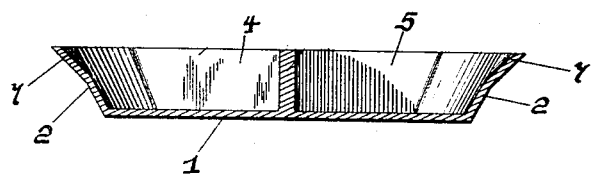

Figure 1 is a plan of my improved cooking utensil, and Fig. 2 is a cross sectional view taken on the line $x$—$x$ of Fig. 1.

To put my invention into practice, I construct my improved utensil of a receptacle 1 having slanting sides 2, carrying a conventional form of handle 3. The receptacle 1 is provided with partitions 4 and 5 formed at right angles to one another, thereby dividing the receptacle 1 into four compartments 6. In order to give strength to the receptacle, the partitions 4 and 5 are preferably made of greater thickness than the side walls and the bottom, as clearly shown in Fig. 2. The slanting sides 2 of the receptacle centrally of the partitions 4 and 5 are bent to form spouts 7 whereby the contents of each compartment can be readily poured from the receptacle.

My improved utensil is particularly adapted as a frying pan and boiler, wherein eatables can be independently fried or cooked and liquids separately boiled.

Attention is directed to the fact that the upper edges of the partitions 4—5 are in the same plane as the upper edge of the side wall 2 of the pan which is an essential and important feature of the construction, as these partitions thus serve as a support for a lid or cover which it may be desired to so shift or position on the pan that the food in one compartment 6 will be covered and at the same time the food in another compartment 6 be uncovered. If these partitions projected above the side walls 2, this advantage would be nullified, and, obviously, if the partitions were of less height than the wall 2 of the pan, the vapors rising from the food in one compartment would have free access into the other compartments. With the partitions constructed as above described, however, any one or all of the compartments may be covered by a single lid, and the shifting of such lid to one side of the pan so as to partially uncover one or more compartments, still leaves the lid firmly supported to effectually cover the remaining compartment or compartments.

The cooking utensil can be readily stamped from metal or cast therefrom, and I do not care to confine myself to the size or number of compartments formed in the utensil.

What I claim and desire to secure by Letters Patent, is:—

As an article of manufacture, a one piece cooking utensil embodying a bottom and integral handle and slanting side walls, and two dividing partitions integral with each other and with the bottom and side walls, the said partitions extending at right angles to each other being of the same height throughout and separating the chamber of the utensil into four equal size substantially triangular compartments, the said partitions being of greater thickness than the thickness of the side walls and bottom, and having their upper edges in the same plane as the upper edge or rim of the side walls, the said slanting side walls of the utensil being flared outwardly at the upper edge centrally of the outer side wall of each compartment to form a plurality of independent pouring lips, one for each of said compartments.

In testimony whereof I affix my signature in the presence of two witnesses.

BELLE COMPSTON.

Witnesses:
H. C. EVERT,
MAX H. SROLOVITZ.